United States Patent [19]

Schranz

[11] Patent Number: 4,660,188
[45] Date of Patent: Apr. 21, 1987

[54] CONTROL CONNECTION FOR A DICTATING MACHINE

[75] Inventor: Hans Schranz, Vienna, Austria

[73] Assignee: U.S. Philips Corporation, New York, N.Y.

[21] Appl. No.: 258,089

[22] Filed: Apr. 27, 1981

[30] Foreign Application Priority Data

May 29, 1980 [AT] Austria ................................ 2869/80

[51] Int. Cl.$^4$ ............................................ G11B 15/04
[52] U.S. Cl. ...................................... 369/25; 360/137; 360/60; 360/74.1; 360/71
[58] Field of Search .............. 369/24, 25, 50; 360/61, 360/62, 69, 137, 60, 74.1, 14.1, 71

[56] References Cited

U.S. PATENT DOCUMENTS

| | | | |
|---|---|---|---|
| 3,984,644 | 10/1976 | Matz | 369/24 |
| 4,001,882 | 1/1977 | Fiori | 360/14.1 |
| 4,328,397 | 5/1982 | Chamberlin | 369/25 |

FOREIGN PATENT DOCUMENTS

| | | | |
|---|---|---|---|
| 2318632 | 10/1974 | Fed. Rep. of Germany | 369/24 |
| 1337422 | 3/1973 | United Kingdom | 369/24 |
| 811326 | 3/1981 | U.S.S.R. | 360/60 |

OTHER PUBLICATIONS

"Hi-Fi Anlage mit Infrarot-Fernbedienung fur 37 Funktionen", Funkschau. 1979, vol. 13, pp. 753-756.

Primary Examiner—Alan Faber
Attorney, Agent, or Firm—David R. Treacy

[57] ABSTRACT

A recording and reproducing apparatus, equipped for connection of a remote control device through a multi-conductor cable, including an encoder in the remote device and decoder in the apparatus so that the number of control conductors in the cable is less than the number of switched control functions. To prevent inadvertent erasure, the recording function is the lowest priority input state to the encoder. In a dictation transcriber, the highest priority input is connected to the reference, so that the transcribing mode is enabled upon disconnection of the remote control microphone.

5 Claims, 1 Drawing Figure

U.S. Patent    Apr. 21, 1987    4,660,188
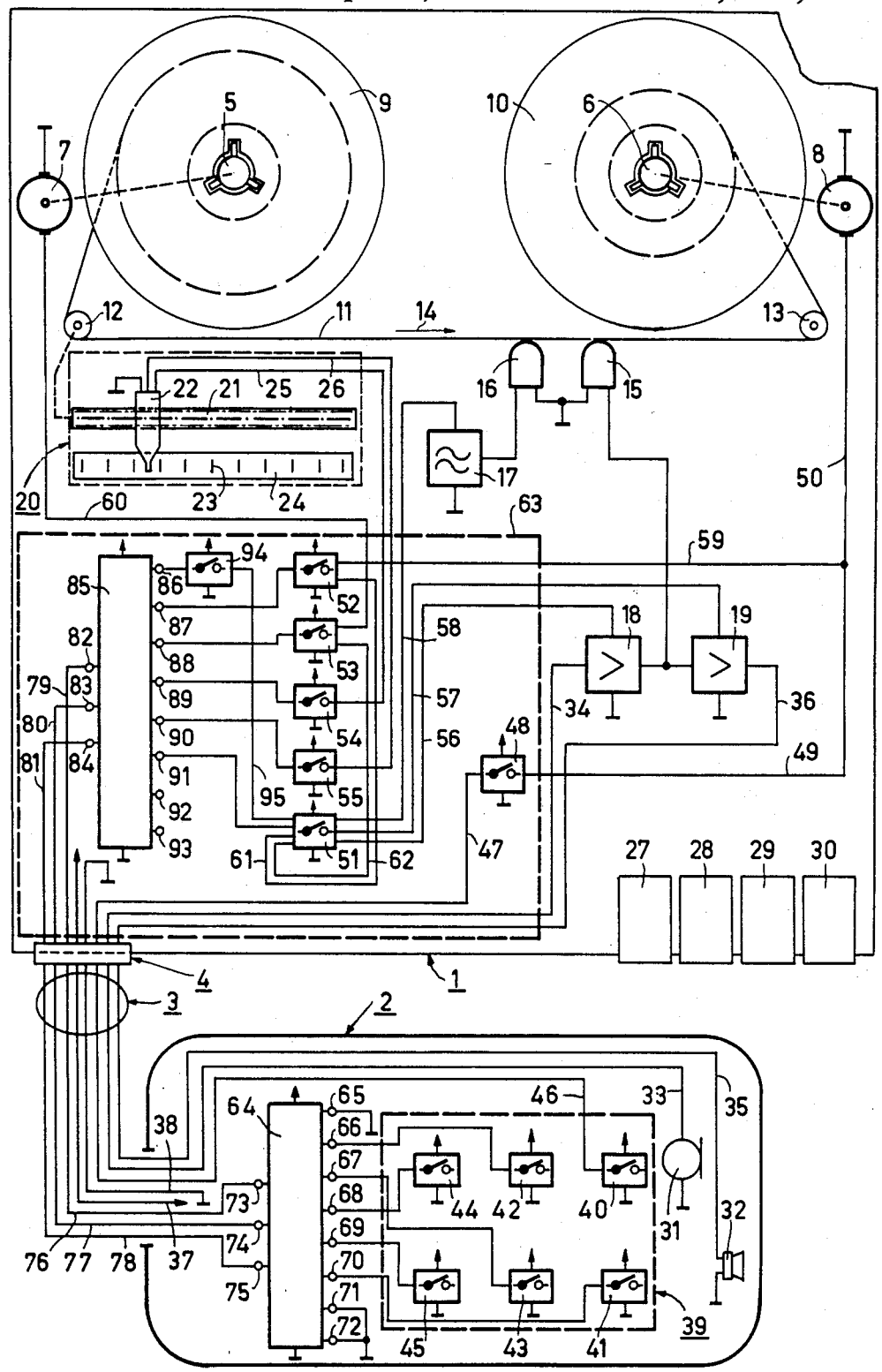

CONTROL CONNECTION FOR A DICTATING MACHINE

BACKGROUND OF THE INVENTION

The invention relates to a recording and/or reproducing apparatus equipped with a remote-control device which is connected to the apparatus through a multi-conductor cable; and more particularly to such a device which comprises switches for selecting control signals, which are transferred through the cable and are processed in the apparatus in order to control the apparatus functions assigned to the switches. Such apparatus is for example known from German Patent No. 23 18 632. Generally, it is attempted to minimize the number of conductors of the cable which connects the remote control device to such apparatus in order that the cable does not become too thick and inflexible and the connector which is generally provided between the cable and the apparatus does not become too intricate and expensive. Furthermore, it is to be noted that from the article "Hi-Fi Anlage mit InfrarotFernbedienung für 37 Funktionen" in the magazine Funkschau 1979, volume 13, pages 753-756, a remote control device is known in which the control signals are transmitted in digital serial form along a single transmission path, namely an infrared link. Here, the desired result is obtained by means of a single transmission path, but the digital serial conversion of the control signals and their subsequent processing is comparatively intricate and expensive.

SUMMARY OF THE INVENTION

It is an object of the invention to obtain a substantial reduction of the number of conductors required in the cable which connects a remote control device to a recorder or player without any significant increase in circuitry.

According to the invention the remote control device is provided with an encoder, to each of whose inputs a switch of the remote control device is connected and to each of whose outputs, on which upon actuation of a switch an encoded control signal in digital parallel form is available, a conductor of the cable is connected and that a decoder in the apparatus has inputs connected to the relevant conductors of the cable and outputs, which correspond to the encoder inputs, which are control signals available for processing in the apparatus. Thus, in accordance with the binary code, for example a maximum of four control signals can be transmitted by means of two conductors of the cable, or eight control signals by means of three conductors, which is obviously a substantial reduction of the number of conductors required.

According to a first aspect of the invention, in a recorder the encoder input having the lowest priority is connected to a switch which serves for starting the RECORDING function. This ensures that if the switch for starting a recording is inadvertently actuated simultaneously with a desired other switch, this does not result in a recording being made because always the higher-order control command from the desired other switch is carried out. Thus, inadvertent erasure of an existing recording is precluded. Of course, a specific order or priority, which is deemed effective, may be assigned to the other switches connected to the encoder inputs. Especially for a dictation apparatus this provides a satisfactory protection against incorrect operation.

According to a second aspect of the invention applicable to an apparatus to which the cable is connected through a detachable connector, the encoder input having the highest priority is connected to the reference potential, and a control signal on the decoder output corresponding to the highest priority encoder input is used for starting at least one predetermined function in the apparatus. In this way it is achieved that, if the cable with the remote control device is not connected to the apparatus, a control signal appears on the decoder output, which is then processed accordingly in the apparatus. By means of such a control signal it is, for example, possible to actuate a warning device. It is found to be very effective if by means of such a control signal the apparatus is automatically set to the PLAYBACK functon, while at the same time a circuit may be activated which ensures that upon termination of a playing operation the record carrier is automatically rewound for a short time, so that by simply disconnecting the remote control device such an apparatus is highly suitable for monitoring or transcribing dictations.

Furthermore it is found to be advantageous if the decoder is constituted by a microprocessor provided in the apparatus. Thus, no separate decoder is required and the microprocessor, which is already present, is utilized more effectively.

The invention will be described in more detail with reference to the drawing, which schematically represents an embodiment of the invention given by way of non-limitative example.

BRIEF DESCRIPTION OF THE DRAWING

The sole FIGURE is a partially schematic block diagram of a dictation machine with a combination remote control microphone and loudspeaker connected thereto.

DESCRIPTION OF THE PREFERRED EMBODIMENTS

A dictating/transcribing machine has a remote control device 2 connected to it through a multi-conductor cable 3 and a connector 4. The apparatus 1 comprises two winding spindles 5 and 6, which can each be driven by means of a motor 7 and 8 respectively. On each of these winding spindles 5 and 6 a reel 9 and 10 respectively is place, between which reels a magnetizable record-carrier tape 11 extends, passing along two drive rollers 12 and 13 respectively. One of the two reels serves as supply reel and the other as take-up reel for the record carrier. In this case it is assumed that the reel 9 is the supply reel and the reel 10 the take-up reel, so that in the NORMAL FORWARD mode of the apparatus the record carrier is moved in the direction of the arrow 14 from the reel 9 to the reel 10, in which case the winding spindle 6 is driven by the motor 8. Obviously, the reels 9 and 10, the record carrier 11 and the guide rollers 12 and 13 may also be accommodated in a cassette in the customary manner, which cassette is then placed onto the apparatus so that the reels co-operate with the winding spindles. In the span of the record carrier 11 which extends between the guide rollers 12 and 13 the record carrier co-operates with a magnetic head 15, by which the signals to be recorded are recorded on the record carrier or are scanned and reproduced. Viewed in the direction of normal forward transport the magnetic head 15 is preceded by a further magnetic head 16, which in the case of recording functions as a erase head, a suitable erase signal being applied to the head 16 by a signal generator 17. A signal to be recorded is applied from the output of an amplifier 18 to the magnetic head 15; altrnatively a signal which is reproduced by the magnetic head 15 is applied to the input of an amplifier 19. Depending on the desired mode, RECORDING or PLAYBACK, either the amplifier 18 and the signal generator 17 or the amplifier 19 are activated.

The apparatus 1 further comprises a counter 20, which indicates the length of record carrier 11 unwound from the supply reel 9. For this purpose a lead screw 21 is driven by the guide roller 12, and a pointer 22 on a lead-screw nut is movable, along a scale graduation 33, which is for example provided on an index strip 24 which can be inserted into the apparatus. The pointer 22 also carries two marking devices, not shown, for the index strip 24, which devices can be actuated selectively by individual solenoids, so that on the index strip 24 marks in the form of strokes can be made either above or below the scale graduation 23. Such marks are generally used when the apparatus is used for dictating, one mark for example denoting the end of a recording, that is "end-of-letter" and the other mark a passage to be corrected, that is "letter correction". The brief actuation of the relevant solenoid for making such marks is effected by the schematically represented lines 25 and 26 respectively, which are driven accordingly by a control device in the usual manner.

In addition to the apparatus functions already described there are also provided a reverse function and fast forward function for the record carrier. For reverse transport, which may also be a fast reverse transport, the reel 9 is driven by the motor 7. For the fast forward function this reel 10 is again driven by the motor 8, the motor 8 being for example connected to a higher supply voltage in order to obtain a faster transport than during normal forward operation. Obviously, it would also be possible to obtain faster transport in that the transmission ratio of a mechanism included between the motor and the winding spindle is changed. Thus, in principle the apparatus has the following functions:

PLAYBACK or RECORDING
NORMAL FORWARD
FAST FORWARD
REVERSE
END-OF LETTER marking
LETTER CORRECTION marking These functions or some of them can be switched on and off from the apparatus itself, for which purpose there are provided some push-buttons 27, 28, 29 and 30, shown schematically, upon whose actuation the relevant functions are switched on or off in the usual manner. For example the normal forward and reverse functions may also be switched on and off by means of a foot switch to be connected to the apparatus.

In addition to these possibilities of controlling the apparatus there is provided a remote control device 2, which can be connected to the apparatus 1 by the cable 3 and the connector 4. To render this remote control device especially suitable for dictation, it also incorporates a microphone 31 and a loudspeaker 32. The microphone 31 is connected to the input of the amplifier 18 via a lead 33, which continues as a conductor in the cable 3 and a further lead 34 in the apparatus and the loudspeaker 32 is connected to the output of the amplifier 19 through a lead 35, which also continues a conductor of the cable 3 and a further lead 36 in the apparatus. Through the leads 37 and 38, which are also formed by separate conductors in the cable 3, the power supply for the remote control device is applied.

For switching on the various apparatus functions from the remote control device 2, this device comprises a control panel 39, which in the present case comprises six symbolically represented switches 40, 41, 42, 43, 44 and 45. In the drawing these switches are schematically represented adjacent each other, which of course need not be so in practice. The switches will rather be arranged so that an ergonomic operation is achieved which is simple and reliable with respect to the functions to be controlled. Of these switches the switch 40 serves for starting normal forward operation. Through a lead 46, which also continues as a separate conductor in the cable 3, it is connected to the apparatus 1, where it is connected to a switching stage 48 via a lead 47, from which stage the motor 8 can be connected to a supply voltage corresponding to normal forward operation through a lead 49 and a further lead 50. By the actuation of the switch 40 a control signal is produced, which is applied to the switching stage 48, through which stage normal forward transport of the record carrier is then switched on and off. It is effective to provide a separate conductor in the cable for this purpose, because the NORMAL FORWARD mode, as is common practice, is independent of the other functions, so that the switch 40 can be actuated independently of the actuation of any one of the further switches 41, 42, 43, 44 and 45 and thus also independently of the functions to be switched by the relevant switches. For a simple and convenient operation for dictation purposes, the switch 40, as is common practice, may be constructed as a slide switch. Of the other switches of the control panel 39 the switch 41 corresponds to the RECORDING mode; here switching facilities in the apparatus ensure that the recording mode is cancelled if either fast forward or reverse transport of the record carrier is selected. Furthermore, if the RECORDING function is not switched on, the PLAYBACK function is automatically switched on. Thus, after actuation of the switch 40 for the NORMAL FORWARD function recording or playback is effected, depending on whether the RECORDING function is or is not switched on. Furthermore, the switch 42 corresponds to the FAST FORWARD mode, the switch 43 to the REVERSE mode, the switch 44 to the END OF LETTER marking function, and the switch 45 to the LETTER CORRECTION marking function. In the apparatus the individual functions are switched on and off by switching stages. Thus, the switch 41 for starting a recording corresponds to the switching stage 51, the switch 42 for starting the fast forward function to the switching stage 52, the switch 43 for starting the reverse operation to the switching stage 53, the switch 44 for making an END OF LETTER mark to the switching stage 54, and the switch 45 for making a LETTER CORRECTION mark to the switching stage 55. The switching stage 51 then switches the amplifier 18 off and on through the lead 56, the amplifier 19 through the lead 57, and the signal generator 17 through the lead 58, thus enabling a selection between recording and playback. The switching stage 52 connects the motor 8 to a power-supply voltage corresponding to the fast forward mode through the lead 59 and the lead 50, thus enabling said motor to be switched on. In a similar way the switching stage 53 connects the motor 7 to a corresponding supply voltage through the lead 60, thus enabling the reverse mode to be switched on. If the RE- CORDING function is switched on, it can be switched off, when either the fast forward or the reverse function is started, through a lead 61, which leads from the switching stage 52 to the switching stage 51 and through a lead 62, which leads from the switching stage 53 to the switching stage 51. The two solenoids, not shown, by means of which the END OF LETTER and LETTER CORRECTION mark can be made, are connected to an appropriate supply voltage through the lead 25 by the switching stage 54 and through the lead 26 by the switching stage. In the drawing all these control functions and further control functions in the apparatus are represented by a block shown in broken lines 63, and are suitably performed by a microprocessor designed for control purposes, as is for example commercially available under the type designation COP 420 L.

In order to enable the switching stages 51, 52, 53, 54 and 55 to be controlled by means of control signals from the corresponding switches 41, 42, 43, 44 and 45 five leads will be required in principle, which would have to be included in the cable 3 as further conductors. However, since the cable 3, as described, already comprises five conductors, which are the extensions of the leads 33, 35, 37, 38 and 46 from the remote control device, this number of five further conductors should be minimized in order to ensure that cable does not become too thick and inflexible and the connector 4 does not become too complicated and bulky. In order to achieve this, an encoder 64 is provided in the remote control device 2. As is known, such an encoder 64, which comprises a series of inputs and a series of outputs, has the property that if a control signal is applied to one of its inputs, a control signal in digital parallel form and corresponding to the relevant input appears on its outputs. In conformity with the binary code two inputs therefore correspond to one output, four inputs to two outputs and eight inputs to three outputs etc. Owing to the binary coding by the encoder in the remote control device the number of further cable conductors required is reduced in accordance with the smaller number of encoder outputs that are required. In the present case at least five inputs are required, so that in this case an encoder having eight inputs and three outputs is to be used. By the use of such an encoder in the remote control device the number of conductors now required in the cable 3 is reduced further from five to three, which is very important in practice.

The encoder 64 used here, as for example commercially available under the type designation HEF 4532 B, comprises the inputs 65, 66, 67, 68, 69, 70, 71 and 72 and the outputs 73, 74, and 75, to which outputs the conductors 76, 77 and 78 for the cable 3 are connected. To five of the inputs of the encoder 64 the relevant switches of the control panel 39 are connected, namely the switch 41 to the input 70, the switch 42 to the input 66, the switch 43 to the input 67, the switch 44 to the input 68, and the switch 45 to the input 69. Upon each actuation of one of the switches, which are suitably constituted by push-button switches, a control signal is applied to the relevant input of the encoder, which converts the single signal into a corresponding digital parallel control signal on its outputs 73, 74 and 75, which then, as is known, may have the form 0 0 1 or 0 1 0 etc. These digital signals are transferred in parallel to the apparatus 1 over the three conductors 76, 77 and 78 of the cable 3 and the connector 4, in which apparatus they can now be applied to the three inputs 82, 83 and 84 of a decoder 85 in the apparatus through leads 79, 80 and 81. The decoder 85, in a similar way to the encoder, has eight outputs 86, 87, 88, 89, 90, 91, 92 and 93, a control signal appearing on only one of the outputs of the decoder in accordance with the instantaneous digital control signal on its inputs, so that the coding of a control signal effected in the encoder 64 of the remote control device is eliminated in the decoder 85 of the apparatus. For the decoder use may then be made of a decoder which is commercially available under the type designation HEF 4028 B, which comprises more inputs and outputs than mentioned in the foregoing, of which only those required are used. Thus, five switching stages 52, 53, 54, 55 and 51 provided in the apparatus are connected to the five outputs of the decoders which correspond to the five inputs 66, 67, 68, 69 and 70 of the encoder 64 to which the switches 42, 43, 44, 45 and 41 are connected, namely the switching stage 51 to the output 91, the switching stage 52 to the output 87, the switching stage 54 to the output 88, the switching stage 54 to the output 89, and the switching stage 55 to the output 90. In this way, upon actuation of one of the switches 41, 42, 43, 44 or 45 on the remote control device the corresponding switching stages 51, 52, 53, 54 or 55 in the apparatus receives a control signal, causing the respective stage to switch on the corresponding apparatus function in the manner described.

As can be seen, this enables two conductors of the cable to be dispensed with, without significantly increasing the amount of circuitry required, because use is made of only two electronic devices, which are of commercially available types.

Since, as is known, the inputs of this type of encoder have a priority relative to each other, that is, the actuation of a higher priority input enables its corresponding parallel output signal, independent of the actuation of one or more lower priority inputs, it is advantageous if of the inputs to which the switches are connected the input having the lowest priority is connected to the switch 41 for switching on the RECORDING function. This ensures that if one of the switches 42, 43, 44 or 45 is intentionally actuated, the RECORDING function cannot be switched on, because always the function of the intentionally actuated switch is switched on since it has always a higher priority than the switch 41. Therefore, such a remote control system prevents the RECORDING function from being switched on inadvertently and thus an existing recording from being erased by accident. In the present embodiment, as described the switch 41 is therefore connected to the input 70 of the encoder 64, because this input has the lowest priority relative to the inputs 66, 67, 68 and 69. The priority order for the switches 42, 43, 44 and 45 which is determined by the encoder, is selected so as to decrease in numerical order, so that the fast forward switch has the highest priority, the reverse switch the next lower priority, then the END OF LETTER marking switch the next lower priority and finally the LETTER CORRECTION marking switch the next lower priority, which is found to be effective in practice, but which may also be chosen differently. The inputs 71 and 72 of the encoder are not needed and are connected to reference potential; in accordance therewith, the outputs 92 and 93 of the decoder are not connected, because no control signals appear on these outputs.

The inherent properties of such an encoder 64 and decoder 85 may be utilized for a further advantageous embodiment of the apparatus. For reasons of stability a decoder whose inputs are opened or disconnected is designed so that in such a case a potential is applied to all its inputs, that is, a digital control signal of the form 1 1 1 is generated. However, this means that the decoder output having the highest priority then supplies a control signal. If the encoder input having the highest priority, which corresponds to the decoder output having the highest priority, is not utilized for control purposes, a control signal appearing on said decoder output may be utilized for special switching purposes in the apparatus. In an apparatus, to which the cable 3 of the remote control device 2 can be connected through a connector 4, these features may be employed for detecting whether the cable 3 of the remote control device is connected to the apparatus. In order to achieve this the input 65 having the highest priority in the encoder 64 is not used for control purposes, but, as can be seen in the drawing, is connected to the reference potential. As a result of this, if none of the switches 41, 42, 43, 44 or 45 of the remote control device is actuated, the input 65 with the highest priority, which is connected to reference potential, determines whether a digital control signal of the form 0 0 0 will appear on the outputs 73, 74 and 75 of the encoder. If the cable 3 is connected to the apparatus by means of a connector 4, this digital control signal is transferred to the inputs 82, 83 and 84 of the decoder 85 and thereby ensures that in such a case no control signal will appear on the decoder output 86 having the highest priority. However, if the cable 3 is not connected, the inputs 82, 83, 84 of the decoder 85 are open and, as described, are set to the state 1 1 1 by the decoder, so that a control signal is applied to the output 86 of the decoder. In order to process this control signal a switching stage 94 is connected to the output 86 of the decoder.

By means of this switching stage 94 the various appropriate functions in the apparatus can be switched on and off. For example, by means of this switching stage 94 a warning device, for example a pilot lamp, can be turned on, which indicates to the user of the apparatus that no remote control device is connected to the apparatus. In the present embodiment the swtiching stage 94 ensures that if no remote control device is connected, the apparatus is automatically set to the PLAYBACK mode. To this end the switching stage 94 is connected through a lead 95 to the switching stage 51 which effects switching between the PLAYBACK and RECORDING modes. In this way the apparatus can only be used as a playback apparatus if the remote control device is not connected, for example in order to monitor or transcribe recorded dictations, so that in addition a foot switch, which is customary for such purposes, may be connected to the apparatus, by means of which foot switch the normal forward and, if desired, also the reverse operation can be switched on and off. However, it is obviously also possible to switch other apparatus functions by means of the switching stage 94. For example, in addition to a change-over of the apparatus to the PLAYBACK mode, a switching device may be actuated which ensures that at the end of normal forward operation a brief reverse transport is obtained automatically, so that during the subsequent normal forward transport the last passage of the recording already reproduced is reproduced again in known manner, which is of special advantage for monitoring or transcribing dictations. Similarly, a foot switch connected to the apparatus can be actuated by means of the switching stage 94.

As can be seen, this enables various functions of the apparatus to be switched on or off, depending on whether a remote control device 2 is or is not connected to the apparatus 1 over the cable 3 with the connector 4 without special provisions on the connector, such as for example a switching contact in order to detect whether the cable is connected to the apparatus.

It has already been stated that for switching on and off the various functions in the apparatus it is effective to employ a microprocessor. In such a case it is also found to be advantageous if the decoder 85 is also constituted by such a microprocessor provided in the apparatus, as is indicated in the drawing by the block represented by the broken lines 63. In this way, a separate decoder may be dispensed with and the microprocessor, which is already present, is utilized more effectively.

Obviously, the invention is not limited to the selection of the operation of the switches 40, 41, 42, 43, 44 and 45 as regards the apparatus functions to be switched thereby, as described in the foregoing. For example, it is alternatively possible to switch the NORMAL FORWARD function on and off by the encoder and decoder, which is then suitably combined with the PLAYBACK and RECORDING functions, while a separate STOP function is provided. If desired, it is of course also possible to switch further apparatus functions by the encoder and decoder.

What is claimed is:

1. A recording and playback arrangement including a recording and playback apparatus operable for a plurality of functions including a RECORDING function and a playback function, a remote control device for the apparatus, and a multi-conductor cable connecting the device to the apparatus; said device comprising a plurality of switches including a RECORDING switch for selecting control signals, and an encoder having a plurality of inputs for connecting said plurality of switches to said multi-conductor cable to provide a respective parallel digital coding on conductors of the cable, corresponding to actuation of individual ones of said plurality of switches; said apparatus including a decoder having inputs connected to respective conductors of the cable, and a plurality of outputs corresponding to the encoder inputs, the encoder outputs being control signals for the control of apparatus functions, characterized in that the encoder inputs have a priority order, each of said individual switches being connected to a respective encoder input and thereby defining priority of said switches;

the encoder output is a respective parallel digital code corresponding to the highest priority actuated switch whenever more than one of said plurality of switches is activated, and the RECORDING switch is connected to the lowest priority input of said encoder, whereby inadvertent initiation of the RECORDING function is prevented while one of the other encoded functions is actuated.

2. A recording and playback arrangement including a recording and playback apparatus operable for a plurality of functions including a RECORDING function and a playback function, a remote control device for the apparatus, and a multi-conductor cable connecting the device to the apparatus; said device comprising a plurality of switches including a RECORDING switch for selecting control signals, and an encoder having a plurality of inputs for connecting said plurality of switches to said multi-conductor cable to provide a respective parallel digital coding on conductors of the cable, corresponding to actuation of individual ones of said plurality of switches; said apparatus including a decoder having inputs connected to respective conductors of the cable, and a plurality of outputs corresponding to the encoder inputs, the encoder outputs being control signals for the control of apparatus functions, characterized in that the encoder inputs have a priority order, each of said individual switches being connected to a respective encoder input and thereby defining priority of said switches;

the encoder output is a respective parallel digital code corresponding to the highest priority actuated switch whenever more than one of said plurality of switches is activated, said multi-conductor cable includes a detachable connector for connecting the cable to said apparatus, and the apparatus includes means responsive to a decoder output corresponding to the highest priority encoder input for selecting the playback function, said means being so connected that, upon disconnection of said connetor from the apparatus, the apparatus is set to the playback function.

3. An arrangement as claimed in claim 2, especially adapted for transcribing dictation on a recording medium transported in the apparatus, characterized in that the encoder input having the highest priority is connected to a reference potential, the apparatus includes means for applying a potential to all the decoder inputs when the control cable is disconnected, and said means for selecting includes means for actuating a brief reverse transport of the recording medium at the end of each normal forward operation.

4. An arrangement as claimed in claim 3, characterized in that the RECORDING switch is connected to the lowest priority input of said encoder, whereby inadvertent initiation of the RECORDING function is prevented while one of the other encoded functions is actuated.

5. An arrangement as claimed in claim 1, 2, 3 or 4 characterized in that the apparatus includes a microprocessor for switching selected apparatus functions on and off, and said decoder is constituted by said microprocessor.

* * * * *